March 26, 1963   F. LÜCK   3,082,747
ROTARY PISTON ENGINE
Filed Jan. 2, 1959
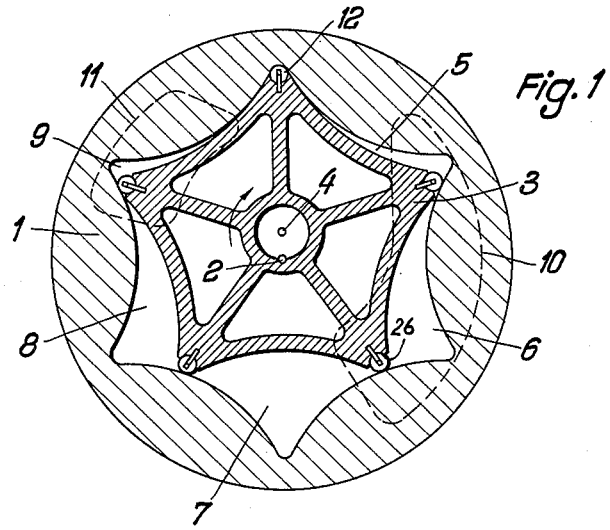
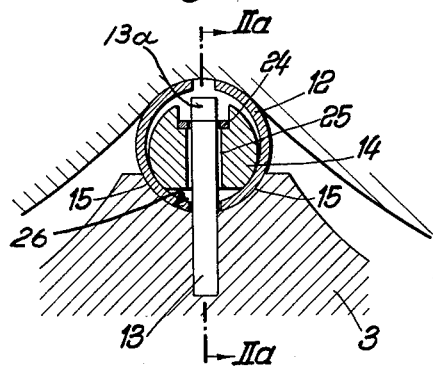
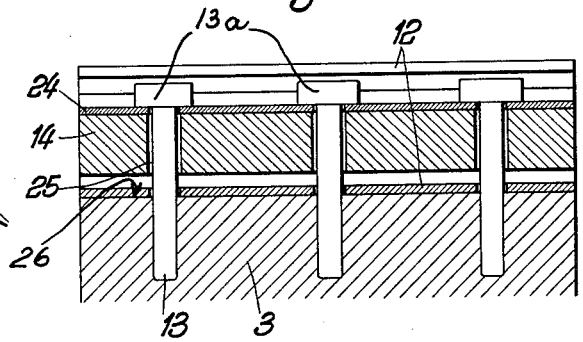
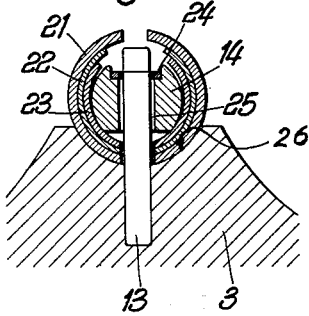
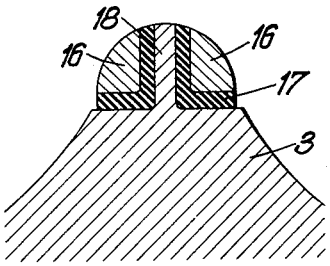
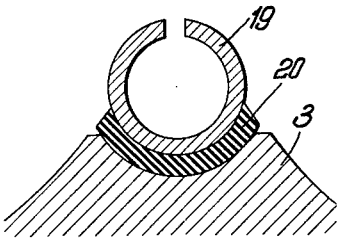
Inventor:
Friedrich Lück
By [signature]
Patent Agent United States Patent Office
3,082,747
Patented Mar. 26, 1963

3,082,747
ROTARY PISTON ENGINE
Friedrich Lück, Berlin-Tegel, Germany, assignor to Borsig Aktiengesellschaft, Berlin-Tegel, Germany
Filed Jan. 2, 1959, Ser. No. 784,719
Claims priority, application Germany Jan. 6, 1958
7 Claims. (Cl. 121—68)

The present invention relates to a rotary piston engine in which two rotary pistons are eccentrically arranged one within the other and are provided with teeth of different number meshing with each other, the arrangement being such that one rotary piston directly drives the other rotary piston.

The operation of engines of the above mentioned type, particularly when high speeds of rotation are involved, is accompanied by bothersome noises which are due to faulty pitch and other inaccuracies of the teeth and in particular shocks brought about by the change of engagement of the teeth of one piston with the teeth of the other piston and when the teeth slide over an unevenness of the leading tooth surfaces.

In connection with rotary piston engines, it has been suggested to tip the tooth tips with synthetic material. Such arrangements are useful at low weight of the rotary piston engines only and at low speeds and in these circumstances bring about a certain shock absorption. These known arrangements, however, are hardly effective at all in radial direction inasmuch as they do practically not expand at all when subjected to centrifugal force.

It is also known to employ movable tooth tips which are guided in radial grooves of the rotary piston and which engage the surface of the counter rotary piston in view of the centrifugal forces acting thereupon. While in such circumstances the seal between the individual working chambers is considerably improved, such arrangements have the drawback that due to the relatively high weight of the tooth tips and due to inaccurate shape of the teeth of the counter piston, shocks of masses occur which may be rather violent at high speeds, particularly inasmuch as a shock absorption in tangential direction does not occur.

It is, therefore, an object of the present invention to provide a rotary piston engine of the above mentioned type, which will overcome the drawbacks outlined above.

It is another object of this invention to provide a radial piston engine with eccentrically arranged toothed pistons which will mesh with each other in such a way that sufficient elasticity will prevail in radial and tangential direction so that the tips of the teeth of the inner rotary piston can snugly fit the surfaces of the teeth of the outer rotary piston.

It is also an object of this invention to provide a rotary piston engine of the type set forth in the preceding paragraph, which will limit the radial movability of the tips of the teeth without the employment of auxiliary means.

These and other objects and advantages of the invention will appear more clearly from the following specification in connection with the accompanying drawings, in which:

FIG. 1 is a cross section through a rotary piston compressor with yieldable tips of the teeth on the inner rotary piston in conformity with the present invention.

FIG. 2 illustrates on an enlarged scale a tooth portion of the rotary piston engine shown in FIG. 1.

FIG. 2a is a section along the line IIa—IIa of FIG. 2.

FIG. 3 is a slight modification of the tip of the tooth of the inner radial piston with regard to the embodiment of FIG. 2.

FIGS. 4 and 5 respectively illustrate similar to FIG. 3 further modifications of the tips of the teeth of the inner radial piston.

*General Arrangement*

The present invention is characterized primarily in that the tips of the teeth of at least one of the two rotary pistons consist of bodies which are adapted elastically to yield in tangential as well as in radial direction. Such tips of the teeth may be formed by tubes extending in axial direction of the rotary piston and connected thereto. The upper free circumferential portion of said tubes may be slit all the way through along the longitudinal direction thereof. If desired, the tips of the teeth according to the invention may also be formed by slidable bodies which are firmly connected to the respective rotary piston by rubber layers of required strength. Also any combination of the just mentioned two embodiments are possible.

*Structural Arrangement*

Referring now to the drawings in detail and FIGS. 1, 2 and 2a thereof in particular, the arrangement shown therein comprises an outer rotary piston 1 adapted to rotate about its axis 2 and thereby to rotate an inner rotary piston 3 by direct engagement of the teeth of both rotary pistons with each other, said inner rotary piston 3 being rotatable about the axis 4. The two rotary pistons 1 and 3 enclose therebetween the working chambers 5, 6, 7, 8 and 9. The rotary piston engine of FIG. 1 furthermore comprises an inlet slot 10 and an outlet slot 11. The tooth tips of the inner rotary piston are tubular and are provided with a longitudinal slit in order to be able to meet their requirements to act satisfactorily both as shock absorber and also as seal not only in tangential but also in radial direction. The tubular tooth tips 12 are fixedly connected to the inner rotary piston 3 by means of hammer head bolts 13 and inserts 14. The said hammer head bolts 13 are press-fitted in the inner rotary piston 3 and, if desired, may be secured against any accidental rotation by pins (not shown in the drawings). As will be seen in particular from FIGS. 2 and 2a, the heads 13a of bolts 13 rest on strip-shaped washers 24. The insert 14 is preferably made of synthetic material as for instance a synthetic resin which may have fiber inserts as for instance the material known under the trademark "Novotex" or a synthetic rubber known under the name "Buna." If desired, the said inserts 14 may also consist of metal as for instance aluminum. The employment of aluminum may be advantageous when the employment of synthetic resin or synthetic rubber is impossible in view of the occurring temperatures of operation. The washers 24 are particularly necessary when the inserts 14 consist of synthetic resin or rubber in order to distribute the surface pressure of the hammer heads. As will be seen from FIGS. 2 and 2a, the inserts 14 are provided with bores 25 somewhat greater than the diameter of the bolts 13 through which the latter pass.

The tubular tooth tips respectively engage grooves 26 of the rotary piston 3, while the flanks of these grooves or the bottom side of the inserts 14 are formed in a manner known per se in such a way that a firm engagement along the flank ends 15 will be assured. This will practically prevent any pullout torques. Inasmuch as the diameters of the inserts 14 are only slightly less than the inner diameter of tube 12, an undue deflection of the legs of the slit tube 12, especially during a quick start, and the acceleration forces inherent thereto will be safely avoided.

If with the embodiment of FIG. 2 oscillations should occur with undesired consequences, the embodiment of FIG. 3 might be adopted which is adapted to cushion and prevent such oscillations. More specifically, to this end, the arrangement of FIG. 3 employs a plurality of split tubes 21, 22, 23 which are arranged one within the other somewhat similar to the well-known leaf spring arrangements, while the individual tubular members differ from each other in length and thickness and thereby have different natural frequencies.

With the embodiment shown in FIG. 4, the tip of the tooth shown therein comprises two sliding members in form of bars 16 which are interconnected by means of rubber 17 or a similar material vulcanized to the rotary piston 3. As will be seen from FIG. 4, the rotary piston 3 comprises a web 18 which may be required if high starting acceleration or high temperatures are encountered. If the rotary piston is made of a material which does not allow a connection of the bars 16 by vulcanization, the upper portion of the rotary piston may be made of suitable material and may be connected to the main body of the rotary piston in any convenient manner. The thickness of the rubber layer 17 must, of course, be so selected that it will meet the required tangential and radial elastic yieldability.

FIG. 5 shows a further embodiment of a tooth tip according to the invention, which comprises an elastic yieldable tooth tip that may be considered a combination of the embodiments of FIGS. 2 and 4. As will be seen from FIG. 5, a slit tube 19 is through the intervention of an elastic intermediate layer 20 and by vulcanization connected to the rotary piston 3. This increases the elasticity of the arrangement. If the elasticity of the intermediate layer 20 by itself should suffice, instead of the slit tube 19, a non-slit tube may be employed.

As will be evident from the above, the arrangement according to the present invention yields a sufficient elasticity in radial and tangential directions so that the tooth tips will be able by widening or displacement toward the outside snugly to engage the surface of the outer rotary piston. In this way, and also due to the low weight of the tooth tips, the intensity of any shocks if such should still occur will be considerably reduced. Also the elastic connection of the tooth tips on all sides with the rotary piston will prevent the transfer of the sound or noises from the respective elements along the mostly hollow rotary pistons which have a tendency to oscillate.

A further advantage of an arrangement according to the present invention consists in that in particular the radial movability of the tooth tips will be limited without additional auxiliary means. This limitation, which may also be accompanied by a slight increase in the theoretically required eccentricity, makes it possible to prevent a contact between the tooth tips and the other rotary piston over a sector of the rotary movement namely within the range in which high sliding speeds occur. This is of great importance if the lubrication is insufficient or faulty.

It is, of course, to be understood that the present invention is, by no means, limited to the particular constructions shown in the drawings but also comprises any modifications within the scope of the appended claims.

What I claim is:

1. An arrangement for sealing between the teeth of the inner piston of a rotary piston engine and the teeth of the outer piston thereof while simultaneously maintaining the teeth of the inner piston in resilient engagement with the teeth of the outer piston in all relative positions of the pistons comprising: tubular cylindrical means extending axially along the tip of each tooth of the inner piston, each tubular means having substantially more than half of the peripheral surface thereof exposed radially outwardly from the tip of the tooth on which it is mounted for engagement with the teeth of the outer piston as the pistons rotate, each tubular means being axially slotted from end to end on the outer side opposite the pertaining tooth to impart resilience to the tubular means so the tubular means will yield as the region of engagement thereof with the teeth of the outer piston shifts circumferentially of the tubular means as the pistons rotate, and means securing each tubular means to its pertaining tooth, said securing means engaging said tubular means adjacent to the pertaining tooth and being spaced from the slotted outer side of the tubular means, said tubular means being relatively thin walled whereby the said outer side thereof is resilient in both the radial and the circumferential directions of the inner piston.

2. A seal arrangement according to claim 1, in which each said tubular means comprises a plurality of telescopically arranged tubular members all slotted along the outer side.

3. A seal arrangement according to claim 2, in which said securing means comprises a bar-like member extending axially along the inside of each of the tubular means and engaging the inside of the tubular means only in the region of the engagement of the pertaining tooth by the tubular means, and means connecting the said bar-like members to the pertaining tooth through the wall of said tubular means.

4. A seal arrangement according to claim 2 in which each said tubular means is in engagement with its pertaining tooth over a region of about one third only of the circumference of said tubular means.

5. A seal arrangement according to claim 1 in which each said tubular means is in engagement with its pertaining tooth over a region of about one third only of the circumference of said tubular means.

6. A seal arrangement according to claim 1 in which each said tubular means is in engagement with its pertaining tooth over a region of about one third only of the circumference of said tubular means, and said securing means comprises a body of elastic material interposed between and bonded to each tubular means and also to its pertaining tooth to effect resilient connection of each tubular means to its pertaining tooth.

7. A seal arrangement for sealing between the tips of the teeth of the inner piston of a rotary piston engine and the teeth of the outer piston thereof comprising: tubular means extending along the tip of each tooth of the inner piston, each tubular means being axially slotted from end to end on the outer side opposite the pertaining tooth, means securing each tubular means to its pertaining tooth, said securing means engaging said tubular means adjacent the pertaining tooth and being spaced from the outer side of the tubular means, said tubular means being relatively thin walled whereby the said outer side thereof is resilient in both the radial and the circumferential directions of the inner piston, said securing means comprising a bar-like member extending axially along the inside of each of the tubular means and engaging the inside of the tubular means only in the region of the engagement of the pertaining tooth by the tubular means, and means connecting each said bar-like member to the pertaining tooth through the wall of said tubular means.

References Cited in the file of this patent

UNITED STATES PATENTS

| 1,442,828 | Rotermund | Jan. 23, 1923 |
| 2,189,976 | De Lavaud | Feb. 13, 1940 |
| 2,466,389 | Davis | Apr. 5, 1949 |
| 2,866,417 | Nubling | Dec. 30, 1958 |
| 2,873,154 | Marker | Feb. 10, 1959 |
| 2,880,045 | Wankel | Mar. 31, 1959 |

FOREIGN PATENTS

| 103,413 | Germany | June 12, 1899 |
| 166,786 | Great Britain | Feb. 21, 1921 |
| 557,902 | Great Britain | Dec. 9, 1943 |
| 590,085 | France | Mar. 10, 1925 |
| 853,807 | France | Dec. 16, 1939 |